United States Patent [19]
Stalker

[11] 3,760,567
[45] Sept. 25, 1973

[54] SMOKE AND AIR CLEANER ASSEMBLY

[76] Inventor: William Stalker, 516 14th Ave. S.E., Calgary, Alberta, Canada

[22] Filed: Aug. 13, 1971

[21] Appl. No.: 171,518

[52] U.S. Cl............ 55/222, 55/228, 55/231, 55/269, 110/119, 261/89, 261/161, 261/DIG. 9
[51] Int. Cl............................................ B01d 47/16
[58] Field of Search............... 55/222, 230–232, 55/267–269, 228; 261/DIG. 9, 89, 90, 158–161, 126; 110/8 A, 119

[56] References Cited
UNITED STATES PATENTS

| | | | |
|---|---|---|---|
| 833,467 | 10/1906 | Lamond | 261/161 |
| 1,112,381 | 9/1914 | Patitz | 261/89 |
| 1,590,893 | 6/1926 | Hodge | 55/230 |
| 1,786,150 | 12/1930 | Cutler | 261/89 |
| 1,828,631 | 10/1931 | Whitney | 55/228 X |
| 1,894,744 | 1/1933 | Hawley | 55/228 X |
| 2,171,535 | 9/1939 | Berg et al. | 110/8 A |
| 3,487,607 | 1/1970 | Cox | 55/230 X |
| 3,530,807 | 9/1970 | Zalman | 110/8 A |
| 3,543,700 | 1/1970 | Baigas et al. | 110/8 A |
| 3,693,326 | 9/1972 | Deane | 55/230 |
| 3,713,276 | 1/1973 | Heard | 55/222 |

Primary Examiner—Frank W. Lutter
Assistant Examiner—Vincent Gifford
Attorney—C. C. Kent et al.

[57] ABSTRACT

A fan assembly is provided with a smoke stack upon which is sprayed water so that the smoke is thoroughly washed. The water is then collected and then discharged externally of the smoke stack unit for further processing. The clean smoke passing through the stack may be further processed by recirculating same through a drier thus controlling the moisture content of the resultant discharging air.

1 Claim, 2 Drawing Figures

PATENTED SEP 25 1973 3,760,567

INVENTOR
WILLIAM STALKER

BY *Kent & Ade*

ATTORNEY

SMOKE AND AIR CLEANER ASSEMBLY

This invention relates to new and useful improvements in smoke and air cleaner assemblies designed primarily for use with incinerating furnaces or commerical installations such as smelters, factories, foundries, chemical and fertilizer plants, and in fact any installation which uses heat for processing thus resulting in a fly ash and/or polluted smoke discharge.

It can also be used for the elimination of dust from such commerical operations as grain elevators, malting plants, flour mills, woodworking shops and the like.

It is primarily designed to control most types of air pollution being discharged from smoke stacks and the like with the least possible operation and maintenance cost.

It is well know, of course, that such pollution can be controlled by relatively expensive electrostatic separators, washing assemblies and the like, but the cost of installation and operating such devices is so great that only major plants can utilize same economically.

The device can be used also for removing pollution from air before pumping same into mines or the like thus reducing filter maintenance costs.

The invention also can be connected to conventional separating tanks or settling tanks in order to separate out the polluted elements picked up by the water incorporated in the invention so that the resultant sludge can either be reprocessed to recover valuable constituents thereof or, alternatively, can be disposed of thus permitting the water in either case, to be discharged into conventional sewage systems without contaminating same.

The principal object and essence of the invention is to provide a fan assembly within the smoke stack assembly upon which is sprayed water so that the smoke is thoroughly washed as it passes through the unit, the water then being collected and discharged externally of the smoke unit for further processing if desired. Furthermore, the cleaned smoke passing through the stack, can if desired, be further processed by recirculating same through a drier thus controlling the moisture content of the resultant discharging air.

It will of course be appreciated that the assembly can receive air and clean and wash same prior to being discharged into air conditioning units or the like.

An easy modification is the provision of a hot water or steam line which, together with a non-foaming detergent, can be utilized to remove heavy pollution constituents such as oils, tars or the like.

The device consists of a plurality of cleaning stages each with its own individual water line thus permitting rigid control of the operation depending upon the circumstances under which it is being used.

A further object of the invention is to provide a device of the character herewithin described which is simple in construction, economical in operation, and otherwise well suited to the purpose for which it is designed.

With the foregoing in view, and such other or further purposes, advantages or novel features as may become apparent from consideration of this disclosure and specification, the present invention consists of the inventive concept which is comprised, embodied, embraced or included in the method, process, construction, composition, arrangement of parts, or new use of any of the foregoing, herein exemplified in one or more specific embodiments of such concept, reference being had to the accompanying Figures in which.

In the drawings like characters of reference indicate corresponding parts in the different figures.

Figure 1:
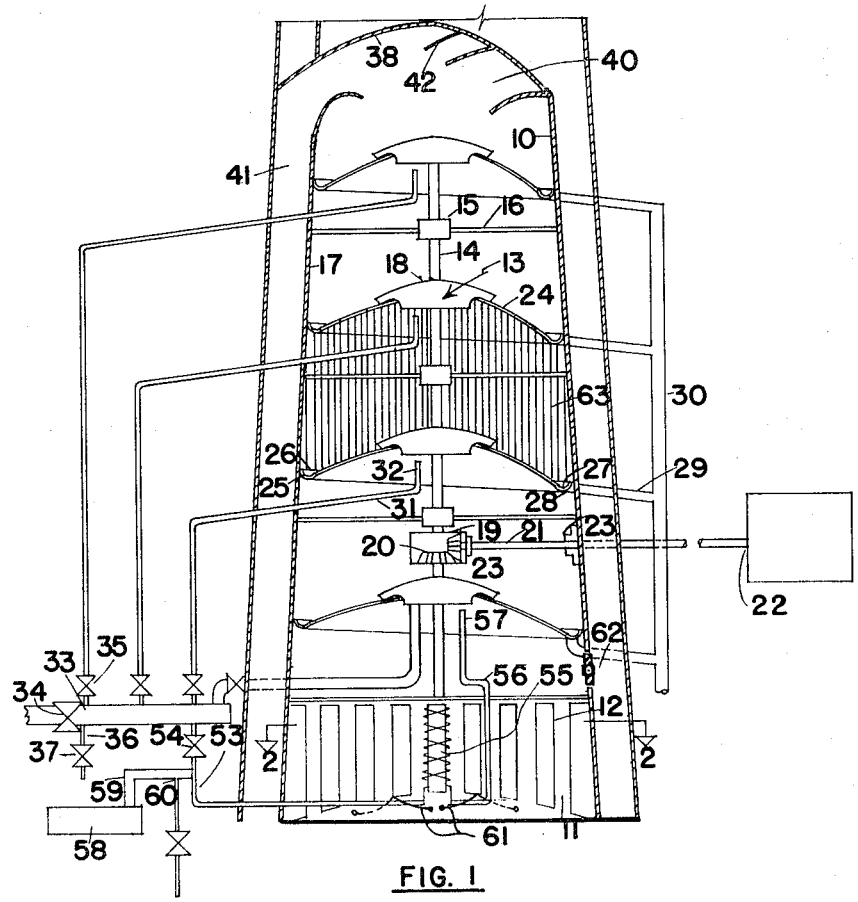
FIG. 1 is a vertical partial section of the device with certain portions shown schematically.

Proceeding therefore to describe the invention in detail, reference character 10 illustrates a substantially truncated cone shaped stack enclousre made from metal.

At the base 11 of this enclosure I illustrate a plurality of vertically situated flue pipes 12 leading from the furnace incinerator or similar device (not illustrated). These flue pipes discharge the products of combustion or industrial process upwardly into the stack enclosure 10.

Situated within the stack enclosure 10 one above the other in spaced apart relationship is a plurality of cleaner stages collectively designated 13.

A centrally located vertically situated drive shaft 14 extends upwardly through the stack enclosure 10 and is supported for rotation within bearings 15 held by spider assemblies 16 extending from the walls 17 of the enclosure 10.

An extractor fan assembly 18 is mounted upon the shaft 14 for rotation at each of the stages 13. This fan is a centrifugal type fan having a domed upper portion thus giving a central intake and a peripheral discharge.

A gear box 19 surrounds shaft 14 and includes bevel gear assembly 20 thus enabling the drive shaft 21 to extend at right angles from the gear box 19, through the wall 17 of the stack enclosure, to a source of power shown schematically at 22, it being understood that bearing 23 support the shaft 21 in the usual manner.

A substantially dome shaped water drain shroud 24 spans the enclosure 10 just below each fan assembly 18 and directs any air or smoke passing upwardly, to the centrally located extractor fan assemblies 18.

The perimeters of these shrouds are in the form of drain gutters 25 which are substantially U-shaped when viewed in cross section. These drain gutters are attached to the wall 17 of the stack enclosure 10 with one side specifically indentified 26, being higher than the other side specifically designated 27. This means that any moisture or water gathering within the gutter 25 gathers at the lowermost point or locus 28 thus enabling a drain conduit 29 to extend from the locus 28, through the wall 17 to a common drain pipe 30 externally of the enclosure by which means any water or moisture may be led to disposal means such as settling tanks and/or sewage disposal assemblies.

Each of the cleaner stages is provided with a water spray line 31 having a spray nozzle discharge 32 situated immediately below the fan assemblies so that any water passing through the conduits is sprayed upon the underside of the fan and is then thrown radially outwardly in the form of a mist or spray against the walls of the enclosure 10 and above the dome 24.

These lines extend to a common manifold 33 connected to a source of water pressure (not illustrated) and controlled by a main shut-off valve 34.

Each of the individual conduits 31 is also provided with its own shut-off valve 35.

A drain conduit 36 with a shut-off valve 37 extends from the manifold 33 so that the system can be drained when necessary.

The operation of the portion of the device hereinbefore described is as follows. Flue gases or the like containing contaminents pass upwardly through the stack enclosure 10 being drawn therethrough by means of the extractor fans 18.

Water is sprayed upon the underside of one or more of these extractor fans depending upon the degree of pollution which thus atomizes the water and mixes same thoroughly with the smoke or contaminated air passing through the fan assemblies. This washes the contaminents from the smoke and these are deposited with the water upon the upper surface of the dome 24 and upon the walls 17 of the stack enclosure 10 so that they run into the gutters 26 and thence through drain conduits 29 to the dispoal drain 30.

Each succeeding stage may clean more of the contaminents from the smoke or air so that when it passes the last or uppermost stage, it is relatively clean although it may be moisture laden.

Under certain circumstances, it is desirable to remove some of this moisture before discharging the cleaned air into the atmosphere under which condition, a dome 38 extends across the upper end 40 of the stack enclosure 10 and directs the moisture leaden air to a downwardly extending conduit 41 situated on one side of the stack enclosure. Curved deflectors 42 extend from the dome 38 and deflect any moisture droplets downwardly to the gutter 26 of the uppermost dome assembly 24.

Figure 2:
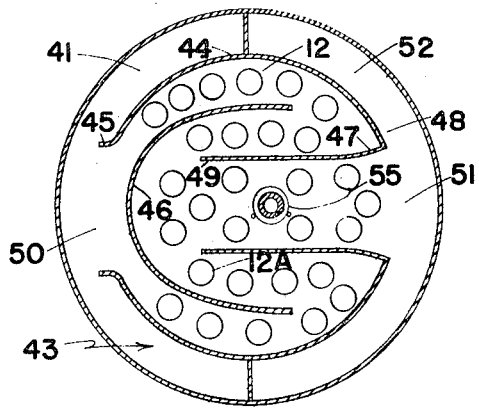
FIG. 2 is a cross sectional view substantially along the line 2—2 of FIG. 1.

The air passes down the trunk or conduit 41 to a drier assembly collectively designated 43 situated at the base of the stack assembly 10. FIG. 2 shows a cross sectional view of the stack assembly at this location and the drier assembly includes arcuately curved outer walls 44 extending around the outer flue oipes 12 and communicating by the ends 45 thereof with the trunk or conduit 41.

An inner arcuately curved wall or barrier 46 extends between the outer flues 12 and th intermediate flues 12A as clearly shown with outlet guide barriers or walls 47 extending between the ends 48 of the walls or barriers 44 and points identified by reference character 49 thus making a serpentine pathway for air passing from conduit 41, into the intake 50 of the air drier assembly and thence to the discharge side 51 whereupon it may pass upwardly through trunk or conduit 52 to be communicated with the upper end of the stack enclosure 10 above the dome 38.

If the contaminents of the smoke are relatively heavy and consist of oils, tars or the like, it is desirable to discharge hot water or steam at least upon the fan 18 of the lowermost stage just above the flue pipes 12.

To this end I have provided a conduit 53 extending from manifold 33 and controlled by valve 54. This conduit extends to a coil 55 situated in the flue area and the discharge side 56 of this coil extends upwardly to a discharge nozzle 57 just below the fan 18 as clearly shown in FIG. 1. A non-foaming detergent supply tank 58 contains detergent which is fed through a conduit 59 and a one-way valve 60 to the conduit 53. A damper assembly shown schematically at 61 controls the heat through the flue pipes 12 thus controlling the temperature of the water and/or steam being discharged at 57.

This depends of course upon the circumstances and the type of contaminent present.

This dissolves some contaminents and subsequent stages condense the steam to water so that the contaminents flow through the gutters and out via drain conduits 29 as hereinbefore described.

I have found it desirable to provide a further damper assembly shown schematically at 62 for allowing extra air to enter in order to give some control to the burning characteristics of the source of heat.

I have also found it desirable to vertically corrugate the inner wall of the enclosure 10 as shown at 63 at least between two adjacent cleaning sections in order to facilitate the condensing or deposition of water from the cleaned smoke or air.

It will of course be appreciated that this device can be used without the flue pipe or drier assembly to clean air passing from such installations as grain elevators, malting plants and the like, in order to eliminate the majority of the dust that may be discharged. This not only eliminates the dust from the air being discharged but also facilitates the cleaning of the air within such plants.

The device can also be used of course in a manner just above described to clean air entering such plants or mines prior to distributing same thus providing a maintennance free air cleaning assembly.

Various modifications can be made within the scope of the inventive concept disclosed.

I claim:

1. A smoke and air cleaner assembly comprising in combination a stack enclosure, a plurality of spaced apart cleaner stages in said stack enclosure, at least one section of said stack enclosure between adjacent cleaner stages is vertically corrugated internally, a plurality of extraction fan assemblies one for each of said stages, a common centrally located vertically situated fan shaft journalled within said enclosure, said fan assemblies being mounted on said shaft, and a source of power operatively connected to said shaft, a selectively operated water spray unit discharging water upwardly in a direction parallel to the vertical axis of at least one of said assemblies and onto the upstream side of said fan assembly for mixing of smoke and water by said fan assembly, and a water drain shroud surrounding said one fan assembly and spanning said stack enclosure, to collect said smoke and water mixture, said drain shroud being substantially dome shaped, a gutter around the periphery thereof against said stack enclosure, one side of said gutter being higher than the other whereby said gutter drains to one common locus, and a discharge extending between said locus and a point externally of said stack enclosure, said stack enclosure including a plurality of flue pipes discharging into the base of said stack enclosure and an air drier assembly at the base of said stack enclosure adapted to move air around said flues and a steam coil within the flue pipe area and operatively associated with said water spray unit to discharge steam onto said one fan assembly, a hood across the upper end of said stack enclosure, said upper end communicating, below said hood, with the intake side of said drier assembly, and a discharge conduit extending from the discharge side of said drier assembly to said upper end of said stack enclosure above said hood, and a plurality of deflectors extending from said hood into said enclosure to trap and direct water droplets from the gases passing thereby.

* * * * *